(12) United States Patent
Aggarwal et al.

(10) Patent No.: US 11,769,133 B2
(45) Date of Patent: Sep. 26, 2023

(54) METHODS, SYSTEMS AND COMPUTER PROGRAM PRODUCTS FOR PREPAYMENT TOWARDS GOODS OR SERVICES AT POINT-OF-SALE TERMINALS

(71) Applicant: MASTERCARD INTERNATIONAL INCORPORATED, Purchase, NY (US)

(72) Inventors: Anurag Aggarwal, Model Town (IN); Shubhangi Sengar, Garha (IN); Rakesh Kumar Patel, Gurgaon (IN); Aditya Koduri, Gurgaon (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 17/638,734

(22) PCT Filed: Jul. 17, 2020

(86) PCT No.: PCT/US2020/042467
§ 371 (c)(1),
(2) Date: Feb. 25, 2022

(87) PCT Pub. No.: WO2021/040904
PCT Pub. Date: Mar. 4, 2021

(65) Prior Publication Data
US 2022/0277284 A1   Sep. 1, 2022

(30) Foreign Application Priority Data

Aug. 27, 2019   (IN) .............................. 201911034517

(51) Int. Cl.
*G06Q 20/28*   (2012.01)
*G06Q 20/06*   (2012.01)
(Continued)

(52) U.S. Cl.
CPC .......... *G06Q 20/28* (2013.01); *G06Q 20/065* (2013.01); *G06Q 20/20* (2013.01); *G06Q 20/405* (2013.01)

(58) Field of Classification Search
CPC ...... G06Q 20/28; G06Q 20/065; G06Q 20/20; G06Q 20/405; G06Q 20/40
See application file for complete search history.

(56) References Cited

U.S. PATENT DOCUMENTS 8,600,881 B2 * 12/2013 Nguyen ................. G06Q 20/20
705/40
2004/0078332 A1 * 4/2004 Ferguson ................ G07F 19/00
705/41

(Continued)

FOREIGN PATENT DOCUMENTS

WO    WO-0115033 A2 *  3/2001    .......... G06Q 20/387
WO    WO-2005115074 A2 * 12/2005    .............. G06F 8/65

(Continued)

OTHER PUBLICATIONS

A. H. Qureshi and A. A. Malik, Evolution of Prepaid Payment Processor's Software Architecture: An Empirical Study (Year: 2012).*

*Primary Examiner* — Scott C Anderson
*Assistant Examiner* — James H Miller
(74) *Attorney, Agent, or Firm* — Harness, Dickey & Pierce, P.L.C.

(57) ABSTRACT

The invention provides systems, methods and computer program products for implementing a prepaid currency transaction. The invention comprises (i) receiving a payment instruction for incrementing or debiting a prepaid currency value stored in a first payment account, (ii) implementing the payment instruction, (iii) identifying a set of POS terminals for implementing a memory update memory within each POS terminal in the identified set of POS terminals, wherein the memory update comprises recording an incremented or (Continued)

decremented prepaid currency value stored in the first payment account as a result of implementing the payment instruction, and (iv) performing the memory update within each POS terminal in the identified set of POS terminals.

9 Claims, 14 Drawing Sheets

(51) Int. Cl.
     *G06Q 20/20*         (2012.01)
     *G06Q 20/40*         (2012.01)

(56) References Cited

U.S. PATENT DOCUMENTS

| | | | | |
|---|---|---|---|---|
| 2006/0175394 A1* | 8/2006 | Caven | .................... | G06Q 20/28 |
| | | | | 235/383 |
| 2007/0267479 A1* | 11/2007 | Nix | .................... | G07F 17/24 |
| | | | | 705/13 |
| 2008/0270514 A1* | 10/2008 | Soares Pi Farias | .... | G06Q 20/20 |
| | | | | 709/228 |
| 2009/0055296 A1* | 2/2009 | Nelsen | .................... | G06Q 40/00 |
| | | | | 705/30 |
| 2009/0171794 A1* | 7/2009 | Hogan | .................... | G06Q 20/4037 |
| | | | | 705/17 |
| 2013/0015241 A1* | 1/2013 | Fernandes | .............. | G06Q 20/24 |
| | | | | 235/380 |
| 2013/0185167 A1* | 7/2013 | Mestre | .................... | G07F 7/127 |
| | | | | 705/21 |
| 2014/0046788 A1* | 2/2014 | Lee | .................... | G06Q 20/36 |
| | | | | 705/21 |
| 2015/0248664 A1* | 9/2015 | Makhdumi | ........ | G06Q 20/3274 |
| | | | | 235/380 |
| 2016/0042340 A1* | 2/2016 | Burke | .................... | G06Q 20/382 |
| | | | | 705/21 |
| 2016/0275483 A1* | 9/2016 | Zhou | .................... | H04W 76/14 |
| 2016/0275558 A1* | 9/2016 | Tiku | .................... | G06Q 30/0261 |
| 2017/0249622 A1* | 8/2017 | Ortiz | .................... | H04L 63/0428 |
| 2020/0126080 A1* | 4/2020 | Bacastow | .............. | G06Q 20/26 |

FOREIGN PATENT DOCUMENTS

| | | | | |
|---|---|---|---|---|
| WO | WO-2009132108 A2 * | 10/2009 | ........ | G06Q 20/0655 |
| WO | WO-2014025742 A1 * | 2/2014 | ........ | G06Q 20/0655 |
| WO | WO2016/049745 | 4/2016 | | |
| WO | WO-2016049745 A1 * | 4/2016 | .......... | G06Q 20/027 |
| WO | WO2017/152265 | 9/2017 | | |
| WO | WO-2017152265 A1 * | 9/2017 | ............. | G06Q 20/20 |

\* cited by examiner

| Payment Account Number ⌐602 | Account ID ⌐604 | Prepaid Currency Value ⌐606 | Transaction History Data ⌐608 | Other Information ⌐610 |
|---|---|---|---|---|
| | | | | |
| | | | | |
| | | | | |
| | | | | |

METHODS, SYSTEMS AND COMPUTER PROGRAM PRODUCTS FOR PREPAYMENT TOWARDS GOODS OR SERVICES AT POINT-OF-SALE TERMINALS

CROSS-REFERENCE TO RELATED APPLICATIONS

This application is a U.S. national stage filing under 35 U.S.C. 371 of International Application No. PCT/US2020/042467, filed Jul. 17, 2020, which claims the benefit of, and priority to, Indian Patent Application No. 201911034517, filed Aug. 27, 2019. The entire disclosure of each of the above applications is incorporated herein by reference.

FIELD OF THE INVENTION

The present invention relates to the domain of electronic payments as consideration towards receipt of goods or services, and more particularly to methods, systems and computer program products for enabling prepayment towards goods or services at point-of-sale (POS) terminals.

BACKGROUND OF THE INVENTION

Electronic payment transactions involving a payment card (e.g. a credit card or a debit card) are widely used. Consumers typically make payments towards goods or services using a payment card.

FIG. 1 illustrates a prior art system environment 100 for implementing electronic payment transactions. System environment 100 comprises a payor 102 having a payment card 112 (for example a credit card or debit card). Payor 102 may initiate payment transactions using payment card 112 through a POS terminal 104—for example by swiping a credit card (the payment card) at a credit card machine (POS terminal 104). POS terminal 104 is communicably coupled to network 106 (which network may comprise a payment network or a data network) and through network 106 to acquirer network 108. Network 106 is also communicably coupled to issuer network 110.

One or both of acquirer network 108 and issuer network 110 may in certain embodiments be configured in the form of the exemplary network 200 illustrated in FIG. 2—comprising a network server 202, network database 204 and interface gateway 206. In a specific embodiment, wherein network 200 is implemented within acquirer network 108, network server 202 may be configured to receive and process information relating to payment card transactions. In an embodiment, the network server 202 may receive or process transactions received only from merchants having a merchant account with the acquirer—which determination may be made based on information retrieved from the acquirer network database 204. In such embodiments, interface gateway 206 may include a hardware or software network gateway configured to enable the acquirer network 108 to communicate with network 106. In an embodiment where network 200 is implemented within issuer network 110, network server 202 may be configured to receive and process information relating to payment card transactions. In an embodiment, network server 202 may only receive or process transactions related to payee accounts that are maintained with the issuer—which determination may be made based on information retrieved from issuer network database 204. Interface gateway 206 may include a hardware or software network gateway configured to enable issuer network 110 to communicate with network 106.

In operation, payor 102 presents payment card 112 for effecting payment of a transaction amount into a payee/merchant account, at POS terminal 104. POS terminal 104 transmits a payment request comprising details of the payment card, the payee/merchant account and transaction amount, to network 106. The payment request is thereafter transmitted to issuer network 110 (corresponding to an issuer that has issued the payor's card) for authorization of the payment request—and subject to payor authorization, the payment amount is transferred to the payee/merchant account (which account is maintained by or within acquirer network 108). The prior art solution presents drawbacks inasmuch that each payment transaction involves time and communication overheads for obtaining transaction authorization from the issuer network. Additionally, the existing state of the art is necessarily reliant on responsiveness of the issuer network, and on real time network communication between POS terminal 104 and issuer network 110—and in case of issuer network failure or in case of communication network failure or high network latency, transactions are unable to be concluded or are concluded slowly and painstakingly. This has been found to particularly present problems in territories where mobile communication and/or internet coverage is inconsistent or unreliable.

There is accordingly a need for a solution that enables prepayment towards future transactions—so that the prepaid value can be utilized at the time of transaction execution, even in absence of a working or responsive issuer network and/or absence of a working or responsive communication network.

SUMMARY

The invention provides methods, systems and computer program products for enabling prepayment towards goods or services, and for implementing prepaid currency value based transactions through point-of-sale (POS) terminals.

In one embodiment, the invention provides a system for implementing a prepaid currency transaction. The system comprises a server configured for (a) receiving from a terminal device, (i) a first payment account identifier corresponding to a first payment account having a prepaid currency value stored therein, (ii) a second payment account identifier corresponding to a second payment account, (iii) a payment amount, and (iv) a payment instruction for incrementing or debiting the prepaid currency value stored in the first payment account, (b) implementing the payment instruction, wherein (v) in an event that the payment instruction is for incrementing the prepaid currency value stored in the first payment account, implementing the payment instruction comprises debiting the payment amount from the second payment account and incrementing the payment amount to the prepaid currency value stored in the first payment account, and (vi) in an event that the payment instruction is for debiting the prepaid currency value stored in the first payment account, implementing the payment instruction comprises debiting the payment amount from the prepaid currency value stored in the first payment account, and crediting the payment amount to the second payment account, (c) identifying a set of POS terminals for implementing a memory update memory within each POS terminal in the identified set of POS terminals, wherein the memory update comprises recording an incremented or decremented prepaid currency value stored in the first payment account as a result of implementing the payment instruction, wherein identification of the set of POS terminals is based on a set of proximity rules that define POS terminal attributes required in each POS terminal within the identified set of POS terminals, wherein the POS terminal attributes required in each POS terminal within the identified set of POS terminals are dependent on identified attributes of the terminal device from which the payment instruction is received, and (d) performing a memory update within each POS terminal in the identified set of POS terminals, the memory update comprising recording the incremented or decremented prepaid currency value stored in the first payment account.

In a particular system embodiment, the identified set of POS terminals comprises two or more POS terminals.

In another system embodiment, the identified attributes of the terminal device from which the payment instruction is received include any of a physical location of the first terminal device, network address of the first terminal device, network properties of the first terminal device, and merchant information corresponding to a merchant with whom the terminal device is associated.

The system may be configured such that the proximity rules include at least one of (a) each POS terminal within the identified set of POS terminals has a physical location that is separated by less than or equal to a maximum permissible physical distance from a physical location of the terminal device, (b) the existence of at least one merchant category code that is associated with the terminal device and each POS terminal within the identified set of POS terminals, (c) each POS terminal within the identified set of POS terminals is associated with the same merchant as the terminal device, and (d) a network address corresponding to each POS terminal within the identified set of POS terminals sharing at least a predefined number of network address segments with a network address corresponding to the terminal device.

The invention additionally provides a method for implementing a prepaid currency transaction. In an embodiment, the method comprises (a) receiving from a terminal device, (i) a first payment account identifier corresponding to a first payment account having a prepaid currency value stored therein, (ii) a second payment account identifier corresponding to a second payment account, (iii) a payment amount, and (iv) a payment instruction for incrementing or debiting the prepaid currency value stored in the first payment account, (h) implementing the payment instruction, wherein (v) in an event that the payment instruction is for incrementing the prepaid currency value stored in the first payment account, implementing the payment instruction comprises debiting the payment amount from the second payment account and incrementing the payment amount to the prepaid currency value stored in the first payment account, and (vi) in an event that the payment instruction is for debiting the prepaid currency value stored in the first payment account, implementing the payment instruction comprises debiting the payment amount from the prepaid currency value stored in the first payment account, and crediting the payment amount to the second payment account, (c) identifying a set of POS terminals for implementing a memory update memory within each POS terminal in the identified set of POS terminals, wherein the memory update comprises recording an incremented or decremented prepaid currency value stored in the first payment account as a result of implementing the payment instruction, wherein identification of the set of POS terminals is based on a set of proximity rules that define POS terminal attributes required in each POS terminal within the identified set of POS terminals, wherein the POS terminal attributes required in each POS terminal within the identified set of POS terminals are dependent on identified attributes of the terminal device from which the payment instruction is received, and (d) performing a memory update within each POS terminal in the identified set of POS terminals, the memory update comprising recording the incremented or decremented prepaid currency value stored in the first payment account.

In an embodiment of the method, the identified set of POS terminals comprises two or more POS terminals.

In another method embodiment, the identified attributes of the terminal device from which the payment instruction is received include any of a physical location of the first terminal device, network address of the first terminal device, network properties of the first terminal device, and merchant information corresponding to a merchant with whom the terminal device is associated.

In a particular method embodiment, the proximity rules include at least one of (a) each POS terminal within the identified set of POS terminals has a physical location that is separated by less than or equal to a maximum permissible physical distance from a physical location of the terminal device, (b) the existence of at least one merchant category code that is associated with the terminal device and each POS terminal within the identified set of POS terminals, (c) each POS terminal within the identified set of POS terminals is associated with the same merchant as the terminal device, (d) each POS terminal within the identified set of POS terminals sharing one or more geographical, locational, territorial, jurisdictional, or positional attributes, and (e) a network address corresponding to each POS terminal within the identified set of POS terminals sharing at least a predefined number of network address segments with a network address corresponding to the terminal device.

The invention further provides a computer program product for implementing a prepaid currency transaction, comprising a non-transitory computer usable medium having computer readable program code embodied therein. The computer readable program code comprises instructions for implementing the steps of (a) receiving from a terminal device, (i) a first payment account identifier corresponding to a first payment account having a prepaid currency value stored therein, (ii) a second payment account identifier corresponding to a second payment account, (iii) a payment amount, and (iv) a payment instruction for incrementing or debiting the prepaid currency value stored in the first payment account, (b) implementing the payment instruction, wherein (v) in an event that the payment instruction is for incrementing the prepaid currency value stored in the first payment account, implementing the payment instruction comprises debiting the payment amount from the second payment account and incrementing the payment amount to the prepaid currency value stored in the first payment account, and (vi) in an event that the payment instruction is for debiting the prepaid currency value stored in the first payment account, implementing the payment instruction comprises debiting the payment amount from the prepaid currency value stored in the first payment account, and crediting the payment amount to the second payment account, (c) identifying a set of POS terminals for implementing a memory update memory within each POS terminal in the identified set of POS terminals, wherein the memory update comprises recording an incremented or decremented prepaid currency value stored in the first payment account as a result of implementing the payment instruction, wherein identification of the set of POS terminals is based on a set of proximity rules that define POS terminal attributes required in each POS terminal within the identified set of POS terminals, wherein the POS terminal attributes required in each POS terminal within the identified set of POS terminals are dependent on identified attributes of the terminal device from which the payment instruction is received, and (d) performing a memory update within each POS terminal in the identified set of POS terminals, the memory update comprising recording the incremented or decremented prepaid currency value stored in the first payment account.

BRIEF DESCRIPTION OF THE ACCOMPANYING DRAWINGS

FIG. 6 illustrates an exemplary data structure for data records generated by or maintained at the prepayment server system in accordance with the teachings of the present invention.

DETAILED DESCRIPTION

The invention provides methods, systems and computer program products for enabling prepayment towards goods or services, and for implementing prepaid currency value based transactions through point-of-sale (POS) terminals.

For the purposes of the present invention, the following terms shall be understood to have the corresponding meanings provided below:

"Acquirer" shall mean a business (e.g., a financial institution or a merchant bank) that contracts with a merchant to coordinate with the issuer network of a customers' payment card.

"Acquirer network" shall refer to a communication network, including hardware, software and other equipment used by an acquirer to transmit and process card based transactions and information related to merchants, customers, payment cards and transactions.

"Payor", "Cardholder" or "Customer" shall mean an authorized payment card user who is making a purchase or effecting an electronic transaction with a payment card.

"Payment network" shall refer to the intermediary between the merchant's acquirer and the customer's issuer (for example, Mastercard® or Visa®). The payment network primarily coordinates payment card transactions between acquirers and issuers, and additionally coordinates clearing and settlement services to transfer payments from issuers to merchants.

"Issuer" shall mean a financial institution that issues payment cards and maintains a contract with a customer or card holder for repayment or settlement of purchases made on the payment card.

"Issuer network" shall refer to a communication network, including hardware, software and other equipment used by an issuer to transmit and process payment card transactions and information related to customers, payment cards and transactions.

"Merchant" or "Payee" shall mean an authorized acceptor of payment cards for the payment of goods or services sold by the merchant.

"Payment card" shall mean a card associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc.

"Payment account" shall mean any account that may be used for the purposes of effecting an electronic payment or electronic transaction, and shall include any electronic transaction account, payment card account, bank account or electronic wallet account.

Figure 3:
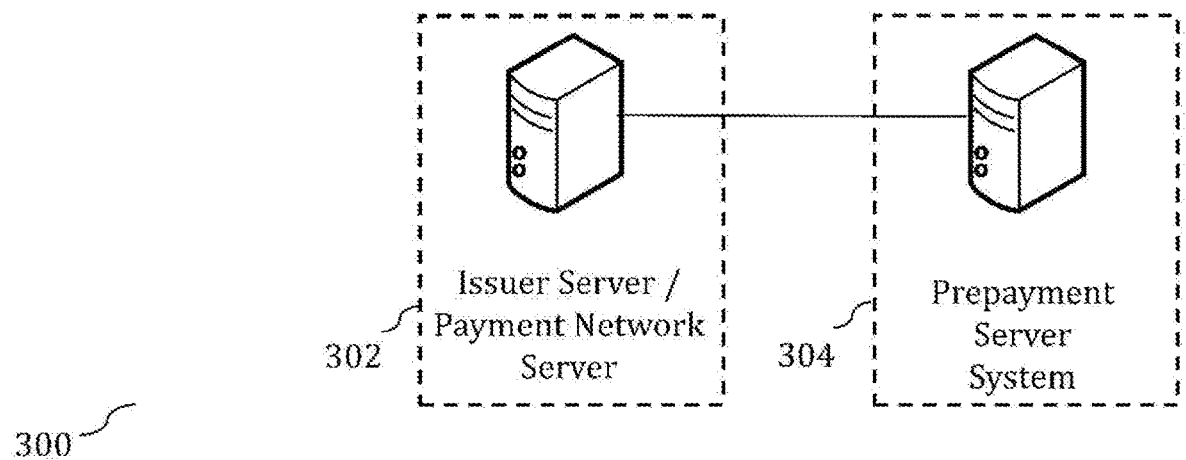
FIG. 3 illustrates specific components within an issuer network or payment network for implementing the present invention.

FIG. 3 illustrates specific components within an issuer network or payment network for implementing the present invention.

The system environment 300 of FIG. 3 can be any of an issuer network or a payment network—as the invention enables implementation of the prepayment server system within (or in communication with either network). As shown in FIG. 3, system environment 300 comprises issuer server or payment network server 302 (depending on whether the system environment corresponds to the issuer network or the payment network) and comprises prepayment server system 304 that is communicably coupled with issuer server/payment network server 302. Issuer server/payment network server 302 is configured to route instructions for adding and or debiting prepaid currency value associated with one or more payment accounts, to prepayment server system 304 for implementation, and to enable prepayment server system 304 to interface with one or more of terminal devices, POS terminals, payor accounts, payee accounts and/or acquirer networks for the purposes of implementing the teachings of the present invention. Prepayment server 304 is in turn configured to receive and implement prepaid currency value based debit and credit instructions, transfer prepaid currency value associated with a payor's payment account to a payee's payment account and update one or more terminal devices and/or POS terminals with data representing prepaid currency value associated with payment accounts. Specific configurations and functionality of the components of system environment 300 are discussed in more detail below.

Figure 4:
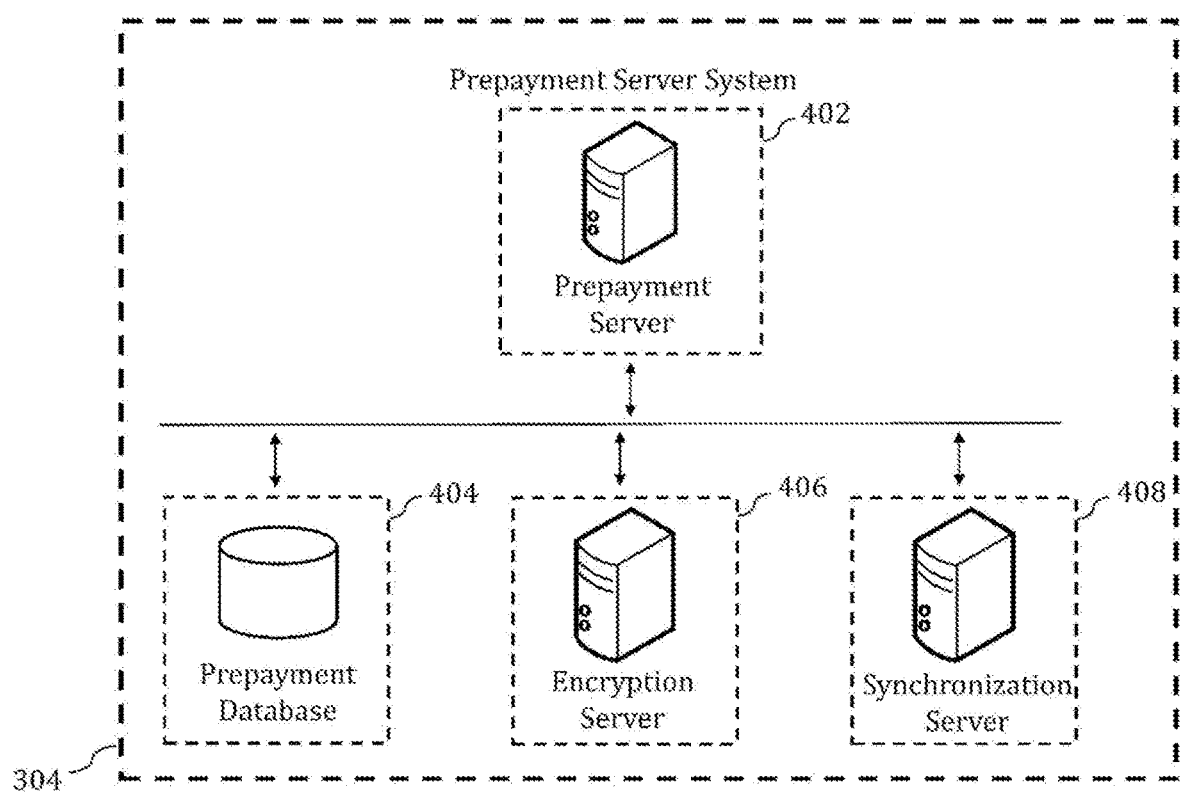
FIG. 4 illustrates an exemplary prepayment server system configured to implement prepayments in accordance with the present invention.

FIG. 4 illustrates in more detail, prepayment server system 304 of FIG. 3. As shown in FIG. 4, prepayment server system 304 comprises prepayment server 402, prepayment database 404, encryption server 406 and synchronization server 408. Prepayment server 402 is a processor implemented server configured to interface with issuer server/payment network server 302 and to receive prepaid value debit and credit instructions, and transfer prepaid currency value associated with a payor's payment account to a payee's payment account.

Prepayment database 404 comprises non-transitory memory storage configured to retrievably store data corresponding to one or more payment accounts registered with prepayment server system 304, and data identified prepaid currency value stored in or associated with each such payment account.

Encryption server 406 comprises a processor implemented server configured to encrypt and/or decrypt any one or more of payment account information, prepaid currency value information, payment account identifier information and/or payment account authentication information that is received at or transmitted from prepayment server 402.

Synchronization server 408 comprises a processor implemented server configured to synchronize between prepayment server system 304 and one or more POS terminals, data states corresponding to prepaid currency values associated with one or more payment accounts that are registered with prepayment server system 304 —and to ensure that said data states are synchronized responsive to a detected increment or decrement of prepaid currency value associated with the one or more payment accounts.

The components of prepayment server system 304 may be configured to implement the methods that are discussed in more details below, in connection with FIGS. 7 to 11.

Figure 5:
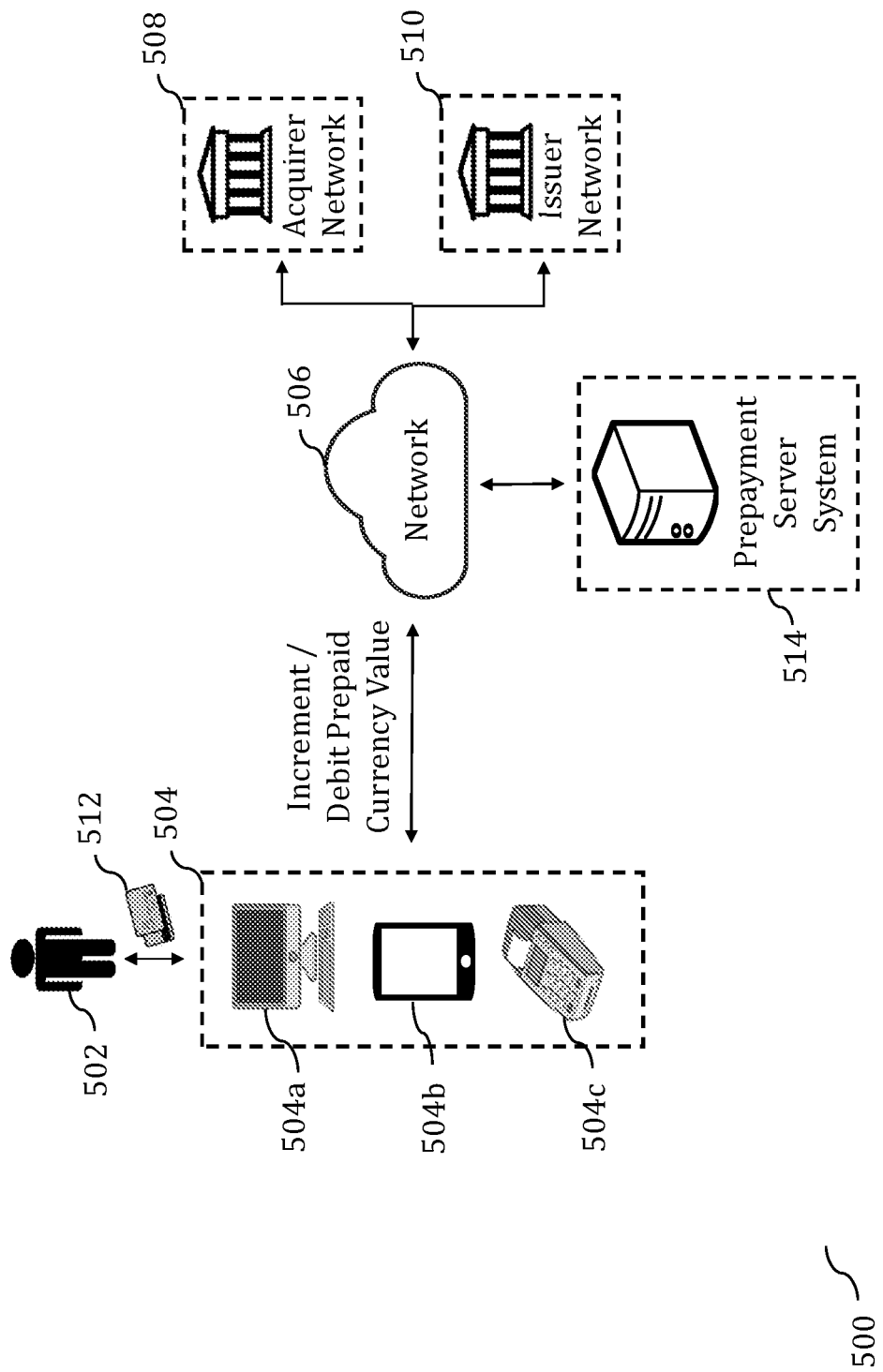
FIG. 5 illustrates an exemplary system environment configured to implement prepayments through a prepayment server system in accordance with the present invention.

FIG. 5 illustrates a system environment 500 configured to illustrate implement prepayments and to enable payment transactions based on prepaid currency value, through a prepayment server system configured in accordance with the teachings of the present invention.

System environment 500 includes payor 502 having a payment card 512. Payor 502 may have access to a terminal device 504 through which payor 502 may add or increment prepaid currency value to a payment account associated with the payor. Terminal device 504 may comprise any processor implemented terminal device that is capable of network communication, and as shown in the illustrated embodiment, may comprise any of computing device 504a, mobile communication device 504b or POS terminal 504c. Payor 502 may additionally initiate from terminal device 504, requests for transferring payment to one or more payee payment accounts based on prepaid currency value associated with the payor's payment account. In various embodiments, the request for carrying out such payment transactions may comprise an instruction to debit a transaction amount from a prepaid currency value associated with the payor's payment account, and to credit the transaction amount to a payee account. In particular embodiments of the invention, at least the requests for transferring a payment amount from prepaid currency value associated with payor 502 (or with a payment account held by payor 502) may be initiated at POS terminal 504c—by submitting through POS terminal 504c, information corresponding to at least the payor's payment account with which prepaid currency value is associated (and from which a transaction amount requires to be debited), the transaction amount, and a payee payment account (to which the transaction amount requires to be credited).

Figure 1:
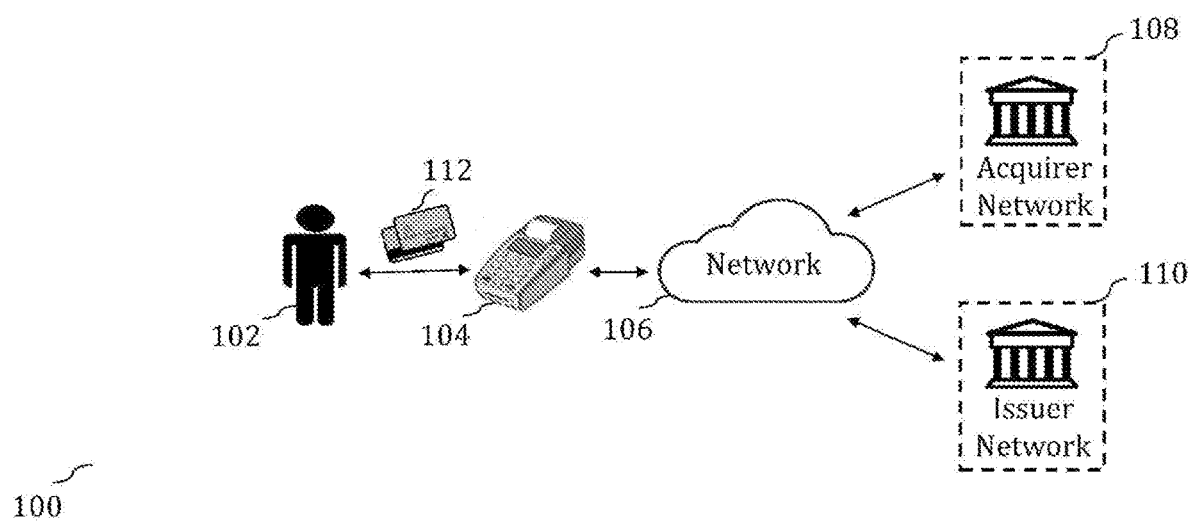
FIG. 1 illustrates a prior art system environment for implementing payment card based transactions through a POS terminal.
Figure 2:
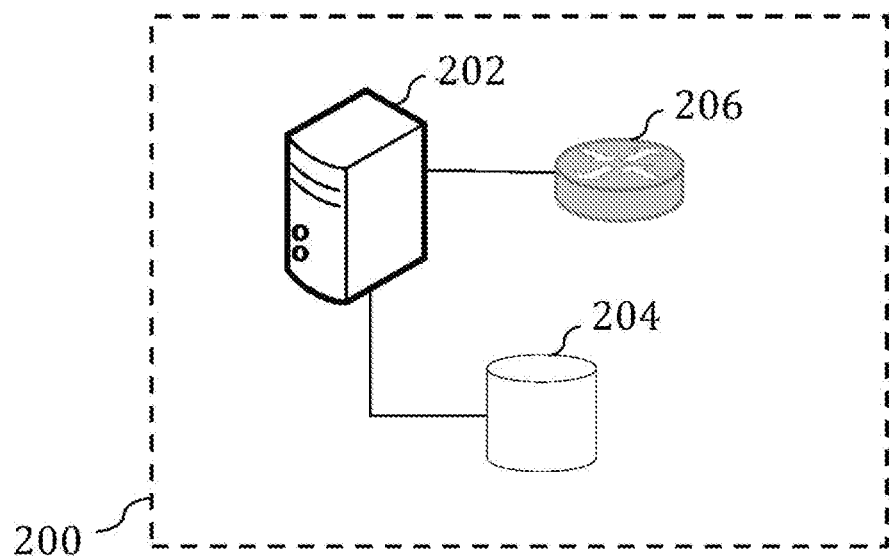
FIG. 2 illustrates an exemplary system configuration of a type that may be implemented within an acquirer network or an issuer network.

Terminal device 504 is communicably coupled to network 506 (which network may comprise a payment network or a data network) and through network 506 to acquirer network 508 and issuer network 510. As in the case of the environment of FIG. 1, one or both of acquirer network 508 and issuer network 510 may in certain embodiments be configured in the form of the exemplary network 200 illustrated in FIG. 2—comprising a network server 202, network database 204 and interface gateway 206.

Network 506 is additionally communicably coupled with a prepayment server system 514 (which in an embodiment is configured according to the embodiment illustrated in FIG. 5). Prepayment server system 514 is configured for direct or indirect network based communication with one or more of terminal device 504, network 506, acquirer network 508 and issuer network 510.

In operation, system environment 500 enables payor 502 to (i) add prepaid currency value to a payment account associated with payor 502 and which is registered or associated with prepayment server system 514 and (ii) effect payment of a transaction amount to a payee payment account or merchant payment account—by debiting the transaction amount from prepaid currency value stored in the payment account associated with payor 502, and crediting the transaction amount to the payee payment account or merchant payment account. In a preferred embodiment, one or both of adding prepaid currency value to a payment account associated with the payor, and debiting prepaid currency value from the payment account associated with the payor, may be achieved through requests initiated at a POS terminal 504c.

The implementation of prepaid currency value based transactions within system environment 500 is explained in more detail in connection with the method embodiments described below.

FIG. 6 illustrates an exemplary data structure 600 for storing data records generated by or maintained at the prepayment server system—for example, data records that are retrievably stored in prepayment database 404 of prepayment server system 304 (as illustrated in FIG. 4).

Each data record within data structure 600 comprises a plurality of data fields including one or more of (i) data field 602 configured to store a payment account number uniquely associated with a payment account, (ii) data field 604 configured to store an account identifier uniquely associated with the payment account—which may comprise any unique identifier, including a numeric, alpha-numeric or alphabetical account identifier, a biometric account identifier or any other form of identifier that can be input by a user or payor at a terminal device for uniquely identifying a payment account that is registered with a payment server system with which said payment account is registered, (iii) data field 606 configured to store a prepaid currency value representing a current prepaid currency amount that is associated with or stored within the payment account, (iv) data field 608 configured to store transaction history data—i.e. data representing the details of one or more prior payment transactions associated with the payment account, including without limitation, any of the transaction amount, whether the transaction is a credit transaction or a debit transaction, source of the transaction funds, destination of the transaction funds, and date and time of transaction, and (v) one or more data field(s) 610 that may be configured to store other information relevant to operation and/or maintenance of the payment account.

During operation of a payment account registered with a prepayment server system in accordance with embodiments of the present invention, the prepayment server system may record transaction information corresponding to each payment account, in one or more data records of the type described in connection with FIG. 6.

Figure 7:
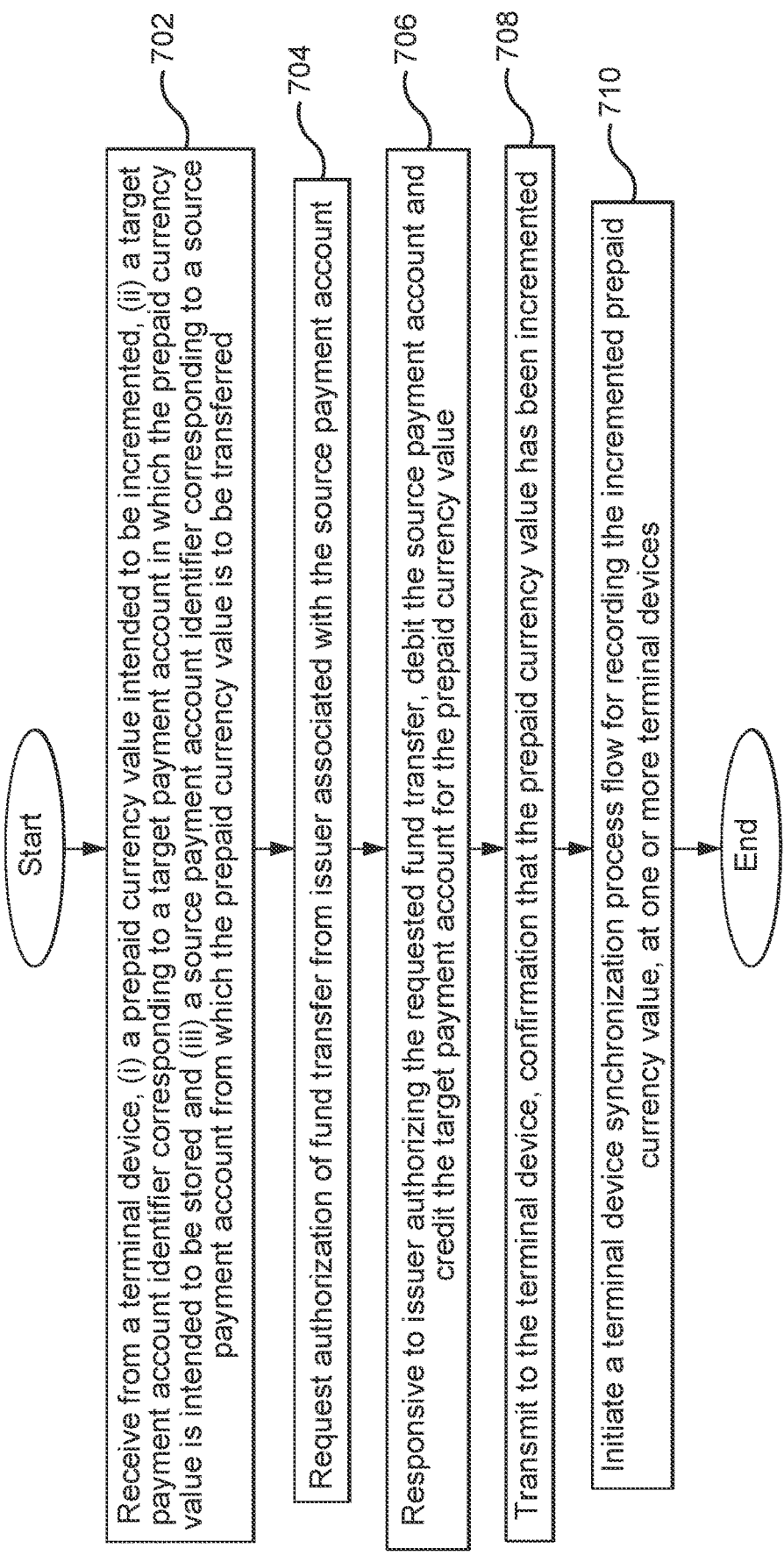
FIG. 7 is a flowchart illustrating a method for associating prepaid currency value with a payment account.

FIG. 7 is a flowchart illustrating a method for adding or associating prepaid currency value with a payment account registered with a prepayment server system of the type described above.

Step 702 comprises receiving from a terminal device, (i) a prepaid currency value that is intended to be added or incremented to a payment account and which is registered or associated with the prepayment server system, (ii) a target payment account identifier which uniquely identifies a target payment account in which the prepaid currency value requires to be added, incremented or stored and (iii) a source payment account identifier which uniquely identifies a source payment account from which the prepaid currency value is to be transferred or credited to the target payment account.

The target payment account identifier may comprise an account identifier that uniquely identifies a payment account that is registered or otherwise onboarded with prepayment server system 514. The source payment account identifier may comprise an account identifier that uniquely identifies any payment account from which the prepaid currency value amount is intended to be transferred to the target payment account—and may include any of a bank account, credit card account, or other physical or electronic payment account, from which currency value is intended to be prepaid into the target payment account.

In an embodiment, the terminal device from which the prepaid currency value, target payment account identifier and source payment account identifier, are received may comprise terminal device 504 within system environment 500, and the prepayment server system may comprise prepayment server system 514 within system environment 500. In a particular embodiment, terminal device 504 is a POS terminal 504c, and the data received at step 702 is received from a payor through POS terminal 504c in response to the payor being presented (through POS terminal 504c) with an option to add prepaid currency value to the payor payment account—subsequent to the payor having operated POS terminal 504c for another payment transaction.

It would be understood that the target payment account may comprise any payment account associated with the payor. In some embodiments, the target payment account may comprise a regular banking account, credit card account, or other electronic payment account associated with the payor, and which has been registered or onboarded with the prepayment server system for enabling said target account to store prepaid currency value. In other embodiment, the target payment account is an electronic payment account specifically generated by the prepayment server system for the purpose of storing prepaid currency value for the payor.

Step 704 comprises requesting from an issuer institution or issuer network associated with the source payment account, authorization of the requested transfer of funds from the source payment account to the target payment account. The authorization process may be implemented in accordance with any number of methods for transaction authentication that would be apparent to the skilled person.

At step 706, responsive to the issuer institution or issuer network authorizing credit of the prepaid currency value, the prepaid currency value is debited from the source payment account and credited to the target payment account. In an embodiment, crediting of the prepaid currency value may be recorded in a data record that is associated with the target payment account and which is maintained by the prepayment server system (for example, prepayment server system 514) in connection with the target payment account.

Step 708 comprises transmitting from the prepayment server system (for example, prepayment server system 514) to the terminal device (for example, terminal device 504), confirmation that the prepaid currency value associated with the target payment account has been incremented.

Step 710 thereafter comprises initiation (for example, at or through prepayment server system 514) of a terminal device synchronization process flow for updating a data state corresponding to the incremented prepaid currency value associated with the target payment account, at one or more POS terminals. The POS ten final synchronization process flow is discussed in more detail below in connection with FIG. 9.

Figure 8:
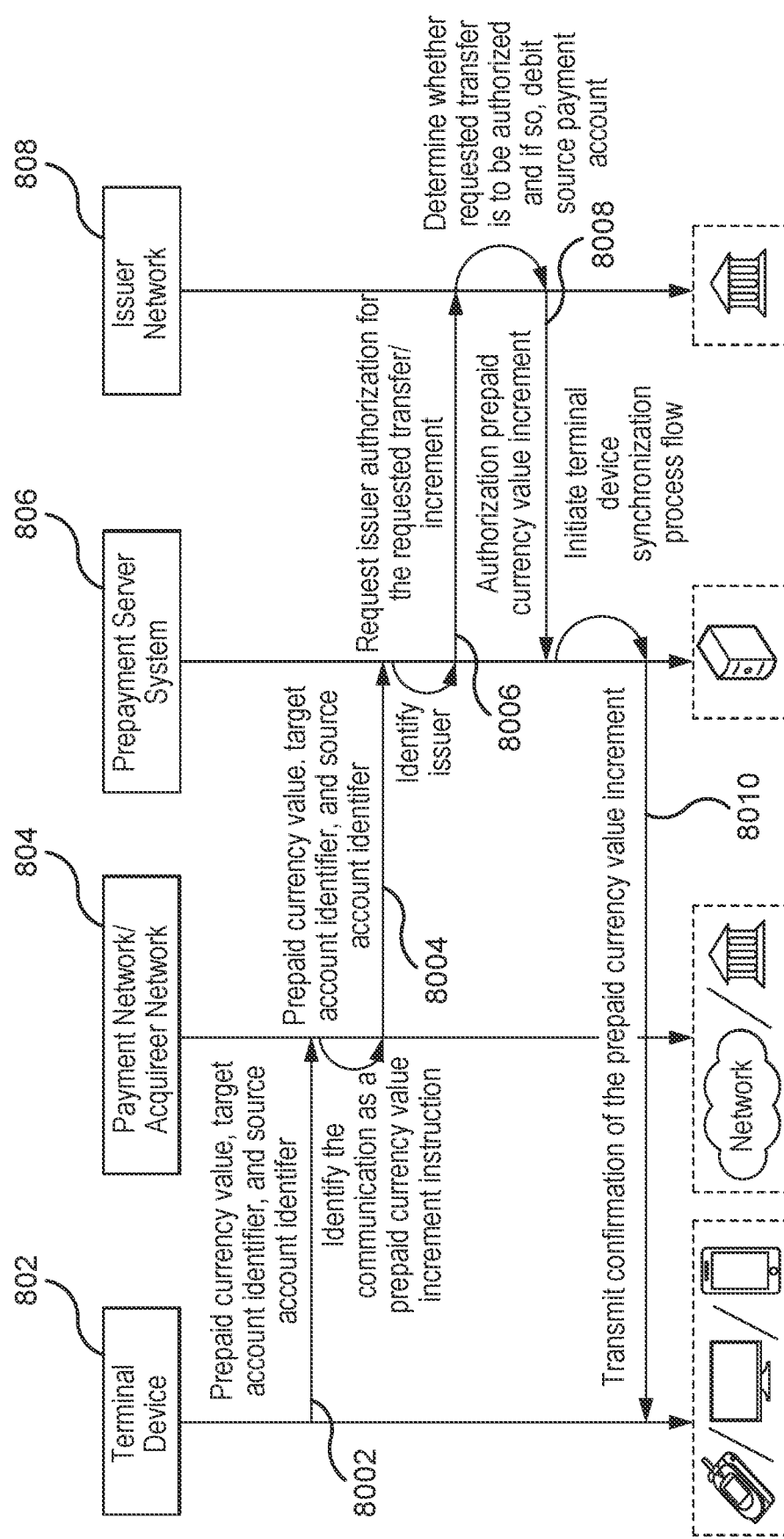
FIG. 8 is a communication flow diagram illustrating communication flow between system entities involved in associating prepaid currency value with a payment account.

FIG. 8 is a communication flow diagram illustrating communication flow between system entities involved in associating or incrementing prepaid currency value with or to a payment account (in accordance with the method of FIG. 7).

Step 8002 comprises transmitting from terminal device 802 to payment network/acquirer network 804, a prepaid currency value increment instruction comprising (i) a prepaid currency value that is intended to be added or incremented to a payment account and which is registered or associated with a prepayment server system 806, (ii) a target account identifier which uniquely identified a target payment account in which the prepaid currency value requires to be added, incremented or stored and (iii) a source payment account identifier which uniquely identifies a source payment account from which the prepaid currency value is to be transferred or credited to the target payment account.

Responsive to payment network/acquirer network 804 identifying the communication received from terminal device 802 as a prepaid currency value increment instruction, at step 8004 payment network/acquirer network 804 transmits the prepaid currency value increment instruction to prepayment server system 806.

Prepayment server system 806 identifies an issuer network corresponding to the source payment account (for example, based on the source account identifier) and at step 8006 requests the identified issuer network 808 that is associated with the source payment account, for authorization of the requested transfer of the prepaid currency value from the source payment account to the target payment account.

Responsive to issuer network 808 authorizing debit of the prepaid currency value from the source payment account and credit of said prepaid currency value to the target payment account, at step 8008, issuer network 808 transmits an authorization for incrementing the prepaid currency value in the target payment account.

Upon receipt of said authorization from issuer network 808, prepayment server system 806 initiates a POS terminal device synchronization process flow for updating a data state corresponding to the incremented prepaid currency value associated with the target payment account, at one or more POS terminals—and thereafter at step 8010 transmits to terminal device 802, confirmation that the prepaid currency value associated with the target payment account has been successfully incremented. In an embodiment of the invention, the terminal device synchronization process flow may comprise the terminal device synchronization process flow described below in connection with FIG. 9.

Figure 9:
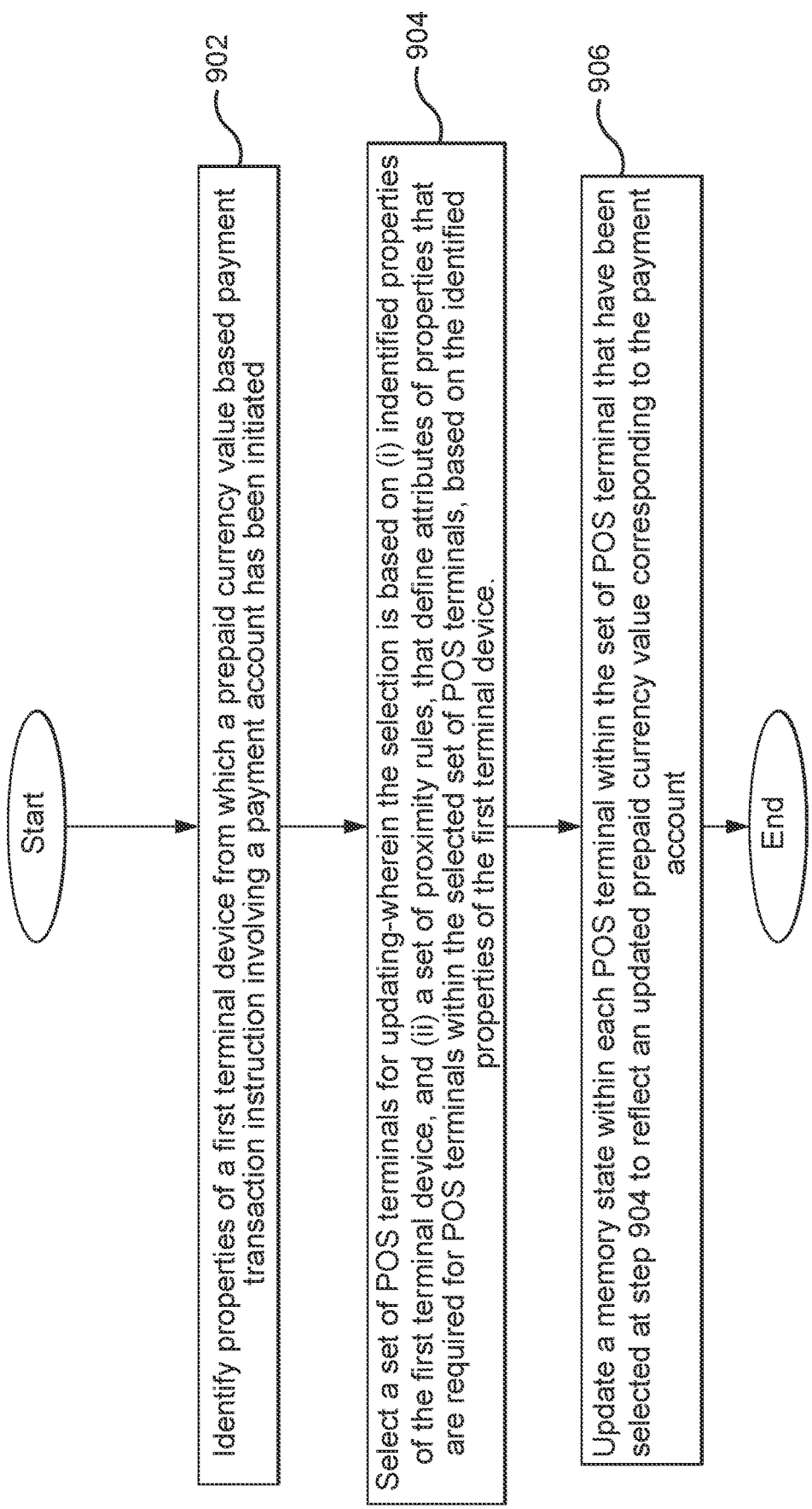
FIG. 9 is a flowchart illustrating a method for selectively updating prepaid currency value information corresponding to a payment account at a set of POS terminals.

FIG. 9 is a flowchart illustrating a process flow for selectively updating prepaid currency value information corresponding to a payment account at a set of POS terminals. The method of FIG. 9 may be implemented in response to a prepaid currency value stored in a payment account being incremented (for example, in accordance with the method of FIG. 7) or in response to a prepaid currency value stored in a payment account being debited or decremented (for example, in accordance with the method of FIG. 10). In an embodiment, the process flow of FIG. 9 may be implemented at synchronization server 408 within prepayment server system 304 of FIG. 4. In an embodiment, the process flow of FIG. 9 is the process flow that is initiated at step 710 of FIG. 7—for recording the incremented prepaid currency value at one or more POS terminals. In another embodiment, the process flow of FIG. 9 is the process flow that is initiated at step 1010 of FIG. 10—for recording at one or more POS terminals, a debit to (or payment out of) a prepaid currency value associated with a payment account.

The objective of the process flow of FIG. 9 is to update a data state associated with a local memory of one or more POS terminals, to record a current or updated prepaid currency value that is associated with a payment account. By recording a current or updated prepaid currency value associated with the payment account within the local memory of a POS terminal, the invention seeks to ensure that such POS terminal can be used to successfully carry out a payment transaction using the prepaid currency value stored in a payment account—without having to first seek transaction authorization from an issuer associated with the payment account—thereby reducing the total transaction time, and also enabling successful transaction completion even in case of network failure or high network latency. At the same time, updating a current or updated prepaid currency value associated with a payment account at every POS terminal connected to or associated with a payment network, acquirer network, or issuer network, would involve an unmanageably large number of data state updates for each payment transaction carried out—and the associated cost and consumption of network resources would be prohibitive as well as wasteful. The process flow of FIG. 9 accordingly seeks to update a current prepaid currency value associated with a payment account in a selected set of POS terminals, wherein selection of the POS terminals to which a data update is effected is based on identifying POS terminals that have a higher likelihood of being used for a future prepaid currency value transaction involving the same payment account.

Step 902 comprises identifying properties of a first terminal device from which a prepaid currency value based payment transaction instruction involving a payment account (i.e. either a prepaid currency value increment instruction or a prepaid currency value debit instruction) has been initiated. In an embodiment of the invention, the identified properties may comprise any of a physical location of the first terminal device, network address of the first terminal device, network properties of the first terminal device, and/or merchant information corresponding to a merchant with whom the first terminal device is associated.

At step 904, a set of POS terminals are selected for being updated to record a current or updated prepaid currency value associated with the payment account—wherein selection of the set of POS terminals is based on (i) identified properties or attributes of the first terminal device, and (ii) a set of proximity rules, that define attributes or properties that are used to select POS terminals for the selected set of POS terminals, and which attributes or properties may be a function of (or dependent on) the identified properties of the first terminal device. Exemplary proximity rules that may be used for selection of the set of POS terminals at step 904 may include:

- each POS terminal within the selected set of POS terminals having a physical location that is separated by less than or equal to a maximum permissible physical distance from a physical location of the first terminal device
- one or more merchant category codes that are associated with both of the first terminal device and each POS terminal within the selected set of POS terminals
- each POS terminal within the selected set of POS terminals being associated with the same merchant as the first terminal device
- each POS terminal within the selected set of POS terminals having one or more shared geographical, locational, territorial, jurisdictional, or positional attributes—for example, having a shared zip code, or having a common part of a zip code address, or being located within a single city, town, street or building address.
- a network address corresponding to each POS terminal within the selected set of POS terminals having a predefined degree of similarity (or sharing at least a predefined number of network address segments) with a network address corresponding to the first terminal device It would be understood that by effecting updates to a set of POS terminals selected according to step 904, the method of FIG. 9 ensures prepaid currency value data updates concerning a specific payment account are effected in respect of POS terminals that have a higher likelihood of being used for a future prepaid currency value transaction involving the same payment account. It would additionally be understood that selection of the set of POS terminals may in certain embodiments be based on combinations of two or more proximity rules.

At step 906 a memory state of each POS terminal within the set of POS terminals that have been selected at step 904 is updated to reflect an updated prepaid currency value corresponding to the payment account (i.e. the prepaid currency value associated with the payment account after completion of one or more increment or debit transactions involving prepaid currency value associated with said payment account)—thereby ensuring that a data state corresponding to the most current state of prepaid currency value associated with the payment account is updated and recorded within a memory associated with each POS terminal within the selected set of POS terminals. In an embodiment, the selected set of POS terminals comprises at least one and preferably two or more POS terminals.

Figure 10:
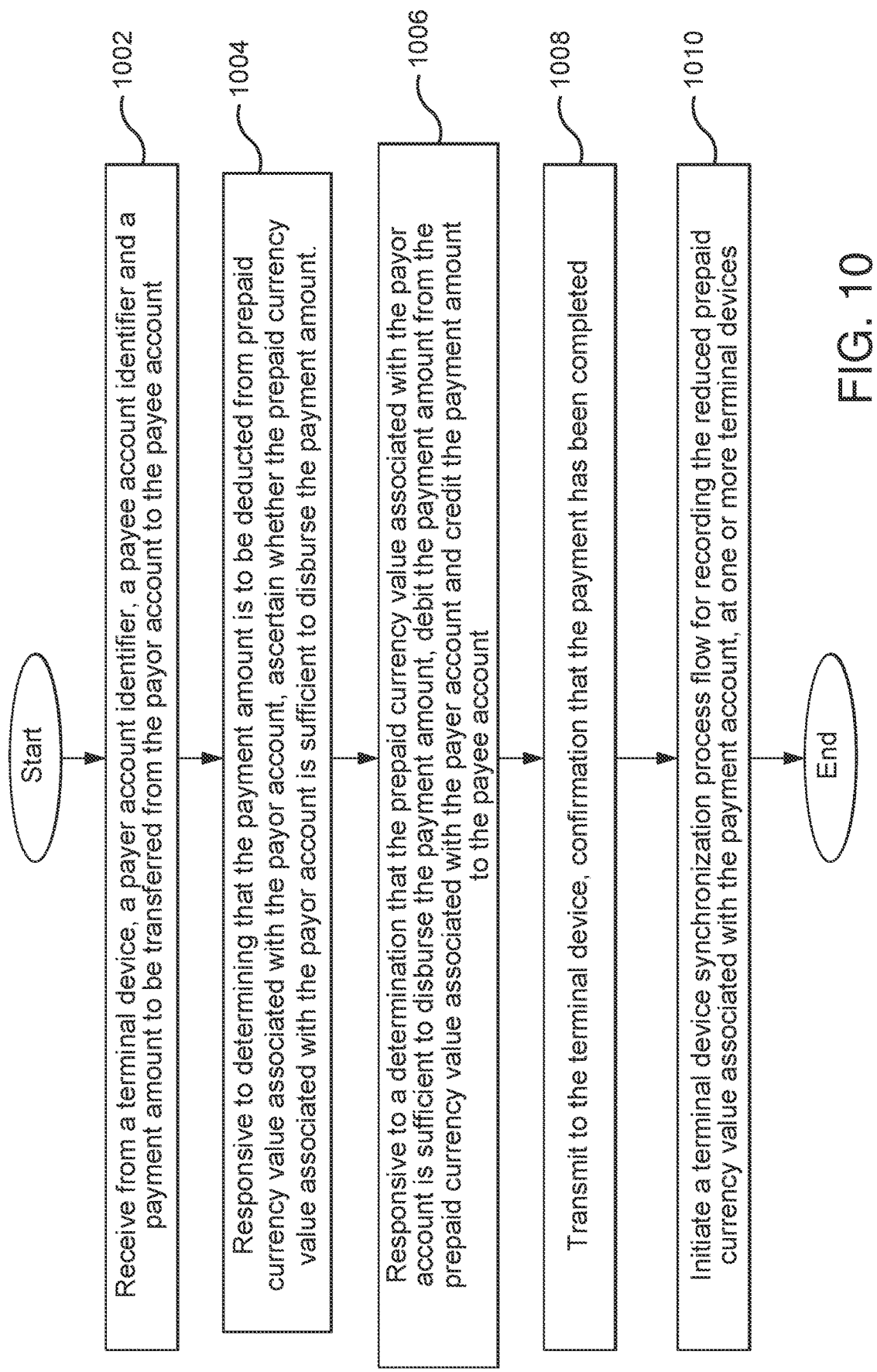
FIG. 10 is a flowchart illustrating a method for utilizing prepaid currency value associated with a payment account, for a payment transaction.

FIG. 10 is a flowchart illustrating a method for utilizing prepaid currency value associated with a payment account, for a payment transaction.

Step 1002 comprises receiving from a terminal device, (i) a payor account identifier which uniquely identifies a payor payment account having prepaid currency value stored therein and from which a payment amount is intended to be debited, (ii) a payee account identifier which uniquely identifies a payee payment account, to which the payment amount is intended to be credited, and (iii) the payment amount intended to be debited from prepaid currency value stored in the payor payment account, and credited to the payee payment account.

The payor account identifier may comprise an account identifier that uniquely identifies a payment account associated with or controlled by the payor and that is registered or otherwise onboarded with prepayment server system 514. The payee account identifier may comprise an account identifier that uniquely identifies any payment account controlled or associated with the payee, and to which the payment amount is intended to be transferred.

In an embodiment, the terminal device from which the data is received at step 1002 is a terminal device 504 within system environment 500, and the prepayment server system comprises prepayment server system 514 within system environment 500. In a particular embodiment, the terminal device 504 is a POS terminal 504c, and the data received at step 1002 is received from a payor through POS terminal 504c in response to the payor being presented (through POS terminal 504c) with an option to execute an electronic payment transaction through POS terminal 504c.

Responsive to determining that the payment amount (identified based on data received at step 1002) is to be deducted from prepaid currency value associated with the payor payment account, step 1004 comprises ascertaining whether the prepaid currency value associated with the payor payment account is sufficient to disburse the payment amount.

At step 1006, responsive to a determination that a prepaid currency value associated with the payor payment account is sufficient to disburse the payment amount, the payment amount is debited from the prepaid currency value associated with the payor payment account and the payment amount is thereafter credited to the payee oayment account. While not specifically shown in FIG. 10, step 1006 may include the process of obtaining authorization of the payment from the payor and/or issuer associated with the payor payment account, in accordance with any number of methods for transaction authentication that would be apparent to the skilled person. In an embodiment, the debiting of the prepaid currency value associated with the payor payment account may be recorded in a data record that is associated with the payor payment account and which is maintained by the prepayment server system (for example, prepayment server system 514) in connection with the payor payment account.

Step 1008 thereafter comprises transmitting from the prepayment server system (for example, prepayment server system 514) to the terminal device (for example, terminal device 504), confirmation that the payment has been completed.

Step 1010 thereafter comprises initiation (for example, at or through prepayment server system 514) of a terminal device synchronization process flow for updating a data state corresponding to the debited or reduced prepaid currency value associated with the payor's payment account, at one or more POS terminals. In an embodiment, the POS terminal synchronization process flow of step 1010 is implemented in accordance with the process flow discussed above in connection with FIG. 9.

Figure 11:
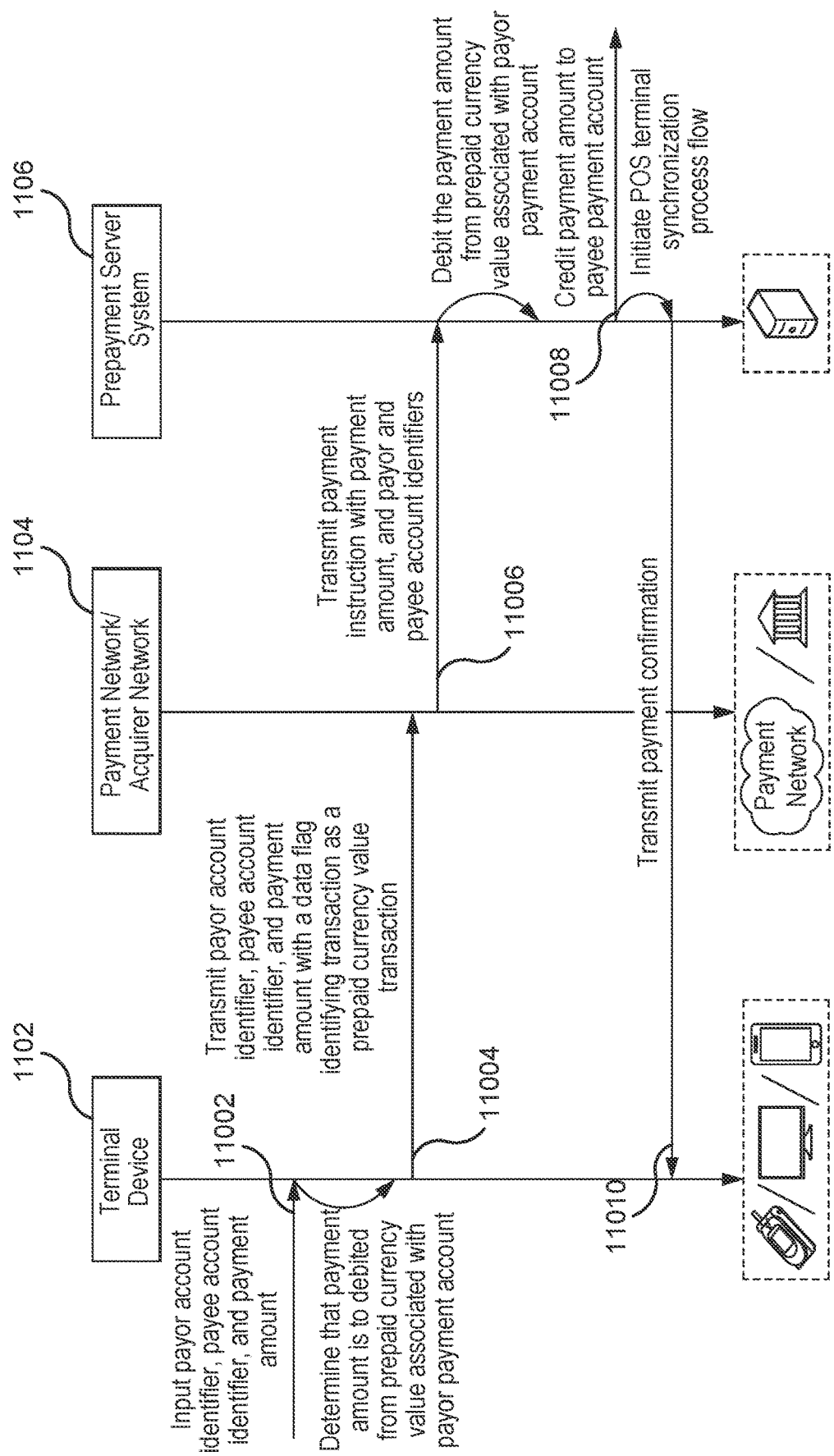
FIG. 11 is a communication flow diagram illustrating communication flow between system entities involved in utilizing prepaid currency value associated with a payment account, for a payment transaction.

FIG. 11 is a communication flow diagram illustrating communication flow between system entities involved in utilizing prepaid currency value associated with a payor payment account, for a payment transaction from the payor payment account to a payee payment account (in accordance with the method of FIG. 10).

Step 11002 comprises receiving at a terminal device 1102, (i) a payor payment account identifier which uniquely identifies a payor payment account, and which payment account has prepaid currency value stored therein and from which a payment amount is intended to be debited, (ii) a payee payment account identifier which uniquely identifies a payee payment account, to which payment is intended and to which the payment amount is intended to be credited, and (iii) the payment amount intended to be debited from prepaid currency value stored in the payor payment account, and credited to the payee payment account.

Responsive to determining that the payment amount (identified based on data received at step 11002) is to be deducted from prepaid currency value associated with the payor payment account, step 11004 comprises transmitting to a payment network/acquirer network 1104, the payor account identifier, the payee account identifier, the payment amount, and a data flag or other data element or information item identifying the transaction under implementation as a prepaid currency value based transaction.

Responsive to receiving the data flag or other data element or information item identifying the transaction as a prepaid currency value based transaction, at step 11006 payment network/acquirer network 1104 transmits a payment instruction to prepayment server system 1106, along with the payor account identifier, payee account identifier and the payment amount.

Prepayment server 1106 responds to receipt of the payment instruction transmitted at step 11006 by debiting the payment amount from a prepaid currency value associated with the payor payment account (and updating a corresponding data record associated with the payor payment account at prepayment server 1106), and at step 11008 credits the payment amount to the payee payment account.

Prepayment server 1106 thereafter initiates a a POS terminal synchronization process flow for updating a data state corresponding to the debited or reduced prepaid currency value associated with the payor's payment account, at one or more POS terminals—and at step 11010 transmits to terminal device 1102, continuation that the payment has been successfully made. In an embodiment of the invention, the terminal device synchronization process flow may comprise the terminal device synchronization process flow described above in connection with FIG. 9.

Figure 12:
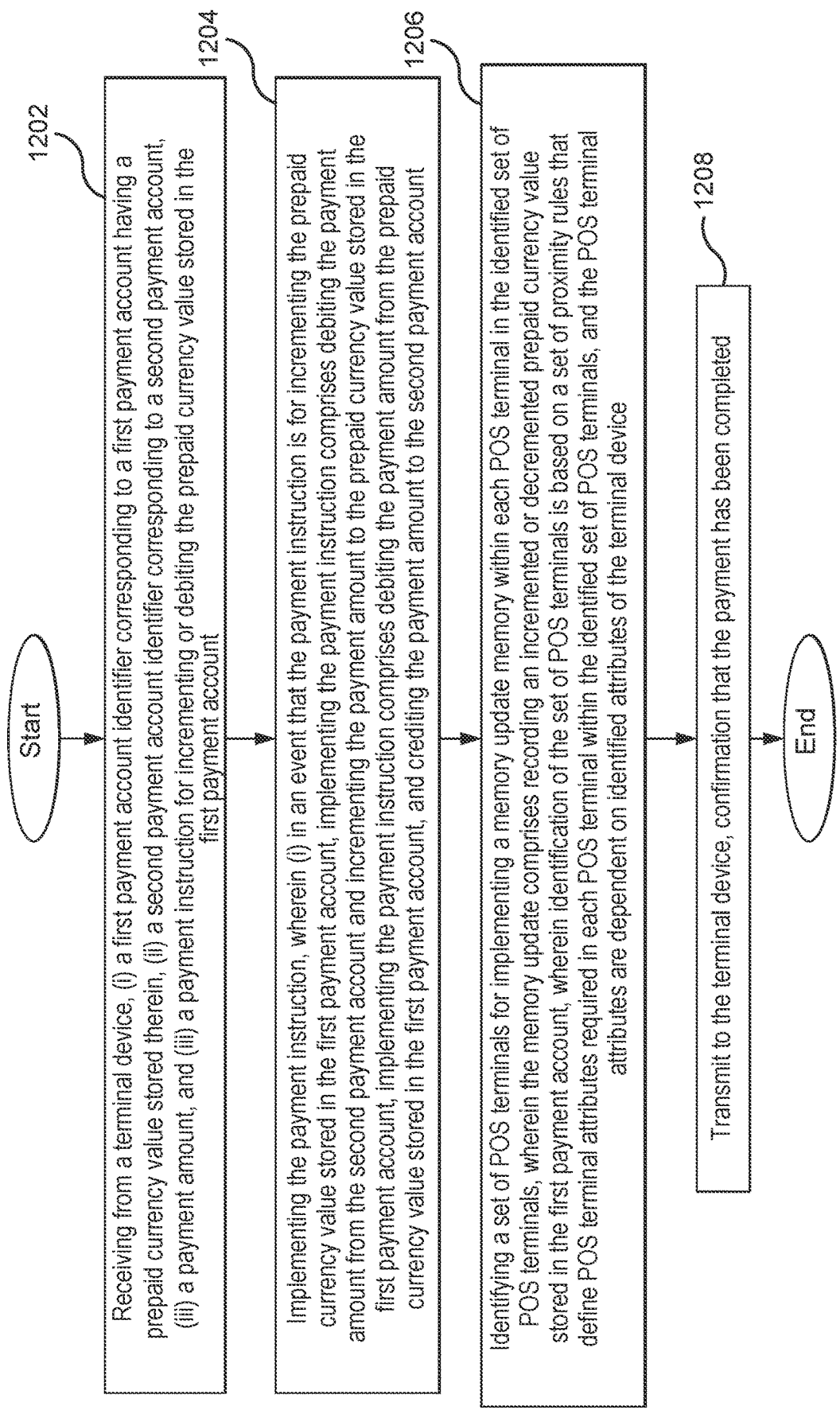
FIG. 12 is a flowchart illustrating a method for updating a set of POS terminals in response to a change in prepaid currency value associated with a payment account.

FIG. 12 is a flowchart illustrating a method for updating a set of POS terminals in response to a change in prepaid currency value associated with a payment account.

Step 1202 comprises receiving from a terminal device (i) a first payment account identifier corresponding to a first payment account having a prepaid currency value stored therein, (ii) a second payment account identifier corresponding to a second payment account, (iii) a payment amount, and (iii) a payment instruction for incrementing or debiting the prepaid currency value stored in the first payment account.

Step 1204 comprises implementing the payment instruction, wherein (i) in an event that the payment instruction is for incrementing the prepaid currency value stored in the first payment account, implementing the payment instruction comprises debiting the payment amount from the second payment account and incrementing the payment amount to the prepaid currency value stored in the first payment account, and (ii) in an event that the payment instruction is for debiting the prepaid currency value stored in the first payment account, implementing the payment instruction comprises debiting the payment amount from the prepaid currency value stored in the first payment account, and crediting the payment amount to the second payment account.

Step 1206 comprises identifying a set of POS terminals for implementing a memory update memory within each POS terminal in the identified set of POS terminals, wherein the memory update comprises recording an incremented or decremented prepaid currency value stored in the first payment account as a result of implementing the payment instruction, wherein identification of the set of POS terminals is based on a set of proximity rules that define POS terminal attributes required in each POS terminal within the identified set of POS terminals, wherein the POS terminal attributes required in each POS terminal within the identified set of POS terminals are dependent on identified attributes of the terminal device from which the payment instruction is received.

Step 1208 comprises performing a memory update within each POS terminal in the identified set of POS terminals, the memory update comprising recording the incremented or decremented prepaid currency value stored in the first payment account.

Figure 13:
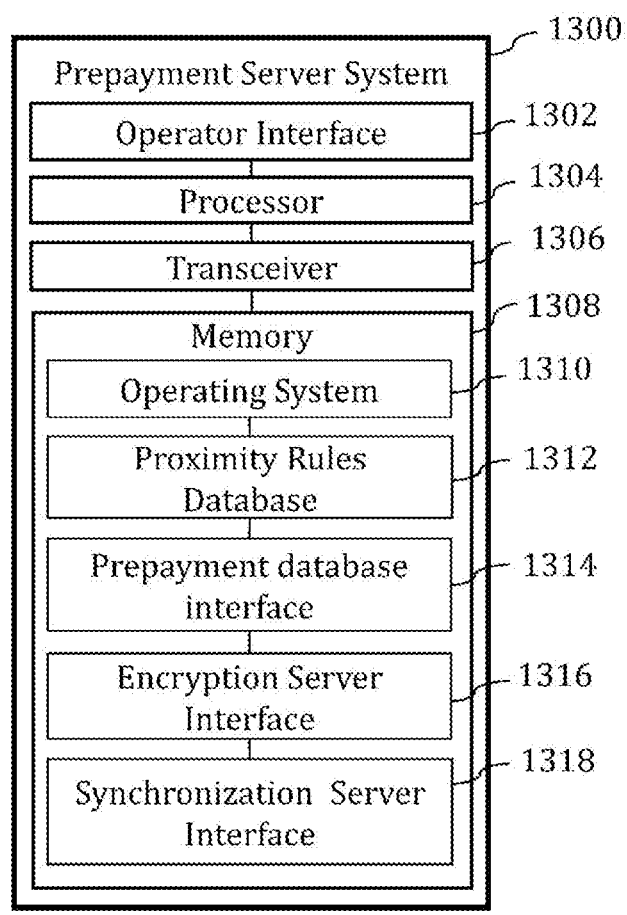
FIG. 13 illustrates a prepayment server configured to implement the methods of the present invention.

FIG. 13 illustrates a prepayment server system 1300 configured to implement the methods of the present invention.

Prepayment server system 1300 may comprise any processor based server system configured for data processing operations and network based communication. In specific embodiments, prepayment server system 1300 may comprise one or more servers. Prepayment server system 1300 may include (i) an operator interface 1302 configured to enable an operator to configure or control the prepayment server system 1300, (ii) processor 1304 configured for data processing operations within prepayment server system 1300, (iii) transceiver 1306 configured for enabling network communication to and from prepayment server system 1300, and (iv) memory 1308, which memory 1308 may include transitory memory and/or non-transitory memory.

In an exemplary embodiment, memory 1308 may have stored therewithin, (i) an operating system 1310 configured for managing device hardware and software resources and that provides common services for software programs implemented within prepayment server system 1300, (ii) proximity rules database 1312 configured to store one or more proximity rules for selecting POS terminals to which updates to prepaid currency values associated with a payment account are propagated during a synchronization process flow (according to the embodiments discussed in connection with FIG. 9), (iii) prepayment database interface 1314 configured to enable processor 1304 to interface with, and retrieve data from or store data to a prepayment database (for example prepayment database 404 of FIG. 4) that is configured to store data records concerning prepaid currency value associated with one or more payment accounts that are registered or onboarded with prepayment server system 1300, (iv) encryption server interface 1316 configured to enable processor 1304 to interface with an encryption server (for example encryption server 406 of FIG. 4) that is configured to encrypt and/or decrypt any one or more of payment account information, prepaid currency value information, payment account identifier information and/or payment account authentication information that is received at or transmitted from prepayment server system 1300, and (v) synchronization server interface 1318 configured to enable processor 1304 to interface with a synchronization server (for example synchronization server 408 of FIG. 4) that is configured to synchronize between prepayment server system 1300 and one or more POS terminals, data states corresponding to prepaid currency value associated with one or more payment accounts that are registered with prepayment server system 1300—and to ensure that said data states are synchronized responsive to a detected increment or decrement of prepaid currency value associated with the one or more payment accounts.

It will be understood that prepayment server system 1300 may be configured to implement one or more of the methods steps and process flows discussed above in connection with FIGS. 7 to 11.

Figure 14:
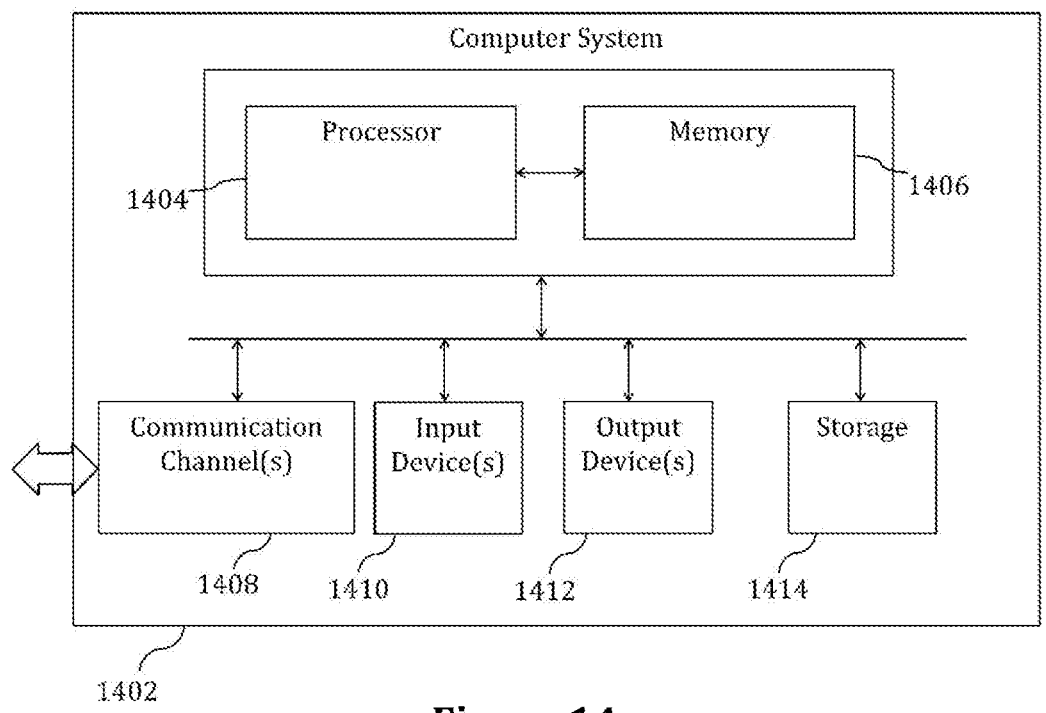
FIG. 14 illustrates an exemplary computer system according to which various embodiments of the present invention may be implemented.

FIG. 14 illustrates an exemplary system 1400 according to which various embodiments of the present invention may be implemented.

System 1400 includes computer system 1402 which in turn comprises one or more processors 1404 and at least one memory 1406. Processor 1404 is configured to execute program instructions—and may be a real processor or a virtual processor. It will be understood that computer system 1402 does not suggest any limitation as to scope of use or functionality of described embodiments. The computer system 1402 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1402 in accordance with the present invention may include one or more servers, desktops, laptops, tablets, smart phones, mobile phones, mobile communication devices, phablets and personal digital assistants. In an embodiment of the present invention, the memory 1406 may store software for implementing various embodiments of the present invention. The computer system 1402 may have additional components. For example, the computer system 1402 may include one or more communication channels 1408, one or more input devices 1410, one or more output devices 1412, and storage 1414. An interconnection mechanism (not shown) such as a bus, controller, or network, interconnects the components of the computer system 1402. In various embodiments of the present invention, operating system software (not shown) provides an operating environment for various softwares executing in the computer system 1402 using a processor 1404, and manages different functionalities of the components of the computer system 1402.

The communication channel(s) 1408 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1410 may include, but is not limited to, a touch screen, a keyboard, mouse, pen, joystick, trackball, a voice device, a scanning device, or any another device that is capable of providing input to the computer system 1402. In an embodiment of the present invention, the input device(s) 1410 may be a sound card or similar device that accepts audio input in analog or digital form. The output device(s) 1412 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1402.

The storage 1414 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1402. In various embodiments of the present invention, the storage 1414 may contain program instructions for implementing any of the described embodiments.

In an embodiment of the present invention, the computer system 1402 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1402. The method described herein is typically implemented as a computer program product, comprising a set of program instructions that is executed by the computer system 1402 or any other similar device. The set of program instructions may be a series of computer readable codes stored on a tangible medium, such as a computer readable storage medium (storage 1414), for example, diskette, CD-ROM, ROM, flash drives or hard disk, or transmittable to the computer system 1402, via a modem or other interface device, over either a tangible medium, including but not limited to optical or analogue communications channel(s) 1408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—in particular, by enabling updating of current states of prepaid currency values associated with payment accounts, at POS terminals—thereby reducing time and communication overheads ordinarily involved in obtaining transaction authorization from the issuer network, and enabling transaction implementation even under high network latency conditions or in case of network failure.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

What is claimed is:

1. A system for implementing a prepaid currency transaction comprising a server configured to:
   receive from a terminal device, (i) a first payment account identifier corresponding to a first payment account having a prepaid currency value stored therein, (ii) a second payment account identifier corresponding to a second payment account, (iii) a payment amount, and (iv) a payment instruction for incrementing or debiting the prepaid currency value stored in the first payment account;
   implement the payment instruction, wherein:
      in an event that the payment instruction is for incrementing the prepaid currency value stored in the first payment account, implement the payment instruction comprises debiting the payment amount from the second payment account and incrementing the payment amount to the prepaid currency value stored in the first payment account; and
      in an event that the payment instruction is for debiting the prepaid currency value stored in the first payment account, implement the payment instruction comprises debiting the payment amount from the prepaid currency value stored in the first payment account, and crediting the payment amount to the second payment account;
   identify a set of POS terminals for implementing a memory update within each POS terminal in the identified set of POS terminals, wherein the memory update comprises recording an incremented or decremented prepaid currency value stored in the first payment account as a result of implementing the payment instruction, wherein identification of the set of POS terminals is based on a set of proximity rules that define POS terminal attributes required in each POS terminal within the identified set of POS terminals, wherein the POS terminal attributes required in each POS terminal within the identified set of POS terminals are dependent on identified attributes of the terminal device from which the payment instruction is received; and
   perform a memory update within each POS terminal in the identified set of POS terminals, the memory update comprising recording the incremented or decremented prepaid currency value stored in the first payment account.

2. The system as claimed in claim 1, wherein the identified set of POS terminals comprises two or more POS terminals.

3. The system as claimed in claim 1, wherein the identified attributes of the terminal device from which the payment instruction is received include any of a physical location of the first terminal device, network address of the first terminal device, network properties of the first terminal device, and merchant information corresponding to a merchant with whom the terminal device is associated.

4. The system as claimed in claim 1, wherein the proximity rules include at least one of:
   each POS terminal within the identified set of POS terminals has a physical location that is separated by less than or equal to a maximum permissible physical distance from a physical location of the terminal device;
   the existence of at least one merchant category code that is associated with the terminal device and each POS terminal within the identified set of POS terminals;
   each POS terminal within the identified set of POS terminals is associated with the same merchant as the terminal device; and
   a network address corresponding to each POS terminal within the identified set of POS terminals sharing at least a predefined number of network address segments with a network address corresponding to the terminal device.

5. A method for implementing a prepaid currency transaction comprising:
receiving from a terminal device, (i) a first payment account identifier corresponding to a first payment account having a prepaid currency value stored therein, (ii) a second payment account identifier corresponding to a second payment account, (iii) a payment amount, and (iv) a payment instruction for incrementing or debiting the prepaid currency value stored in the first payment account;
implementing the payment instruction, wherein:
in an event that the payment instruction is for incrementing the prepaid currency value stored in the first payment account, implementing the payment instruction comprises debiting the payment amount from the second payment account and incrementing the payment amount to the prepaid currency value stored in the first payment account; and
in an event that the payment instruction is for debiting the prepaid currency value stored in the first payment account, implementing the payment instruction comprises debiting the payment amount from the prepaid currency value stored in the first payment account, and crediting the payment amount to the second payment account;
identifying a set of POS terminals for implementing a memory update memory within each POS terminal in the identified set of POS terminals, wherein the memory update comprises recording an incremented or decremented prepaid currency value stored in the first payment account as a result of implementing the payment instruction, wherein identification of the set of POS terminals is based on a set of proximity rules that define POS terminal attributes required in each POS terminal within the identified set of POS terminals, wherein the POS terminal attributes required in each POS terminal within the identified set of POS terminals are dependent on identified attributes of the terminal device from which the payment instruction is received; and
performing a memory update within each POS terminal in the identified set of POS terminals, the memory update comprising recording the incremented or decremented prepaid currency value stored in the first payment account.

6. The method as claimed in claim 5, wherein the identified set of POS terminals comprises two or more POS terminals.

7. The method as claimed in claim 5, wherein the identified attributes of the terminal device from which the payment instruction is received include any of a physical location of the first terminal device, network address of the first terminal device, network properties of the first terminal device, and merchant information corresponding to a merchant with whom the terminal device is associated.

8. The method as claimed in claim 5, wherein the proximity rules include at least one of:
each POS terminal within the identified set of POS terminals has a physical location that is separated by less than or equal to a maximum permissible physical distance from a physical location of the terminal device;
the existence of at least one merchant category code that is associated with the terminal device and each POS terminal within the identified set of POS terminals;
each POS terminal within the identified set of POS terminals is associated with the same merchant as the terminal device;
each POS terminal within the identified set of POS terminals sharing one or more geographical, locational, territorial, jurisdictional, or positional attributes; and
a network address corresponding to each POS terminal within the identified set of POS terminals sharing at least a predefined number of network address segments with a network address corresponding to the terminal device.

9. A computer program product for implementing a prepaid currency transaction, comprising a non-transitory computer usable medium having computer readable program code embodied therein, the computer readable program code comprising instructions for implementing the steps of:
receiving from a terminal device, (i) a first payment account identifier corresponding to a first payment account having a prepaid currency value stored therein, (ii) a second payment account identifier corresponding to a second payment account, (iii) a payment amount, and (iv) a payment instruction for incrementing or debiting the prepaid currency value stored in the first payment account;
implementing the payment instruction, wherein:
in an event that the payment instruction is for incrementing the prepaid currency value stored in the first payment account, implementing the payment instruction comprises debiting the payment amount from the second payment account and incrementing the payment amount to the prepaid currency value stored in the first payment account; and
in an event that the payment instruction is for debiting the prepaid currency value stored in the first payment account, implementing the payment instruction comprises debiting the payment amount from the prepaid currency value stored in the first payment account, and crediting the payment amount to the second payment account;
identifying a set of POS terminals for implementing a memory update memory within each POS terminal in the identified set of POS terminals, wherein the memory update comprises recording an incremented or decremented prepaid currency value stored in the first payment account as a result of implementing the payment instruction, wherein identification of the set of POS terminals is based on a set of proximity rules that define POS terminal attributes required in each POS terminal within the identified set of POS terminals, wherein the POS terminal attributes required in each POS terminal within the identified set of POS terminals are dependent on identified attributes of the terminal device from which the payment instruction is received; and
performing a memory update within each POS terminal in the identified set of POS terminals, the memory update comprising recording the incremented or decremented prepaid currency value stored in the first payment account.

* * * * *